US008614615B2

(12) United States Patent
Cuadra et al.

(10) Patent No.: US 8,614,615 B2
(45) Date of Patent: Dec. 24, 2013

(54) ENERGY TRANSFER ASSEMBLY WITH TUNED LEAKAGE INDUCTANCE AND COMMON MODE NOISE COMPENSATION

(75) Inventors: Jason E. Cuadra, San Jose, CA (US); John R. Estabrooks, Richmond (CA); Raymond K. Orr, Kanata (CA)

(73) Assignee: Power Integrations, Inc., San Jose, CA (US)

( * ) Notice: Subject to any disclaimer, the term of this patent is extended or adjusted under 35 U.S.C. 154(b) by 476 days.

(21) Appl. No.: 12/958,258

(22) Filed: Dec. 1, 2010

(65) Prior Publication Data
US 2012/0140525 A1    Jun. 7, 2012

(51) Int. Cl.
*H01F 27/30* (2006.01)
*H01F 27/28* (2006.01)
*H02M 3/335* (2006.01)
*H02M 5/16* (2006.01)

(52) U.S. Cl.
USPC ........... 336/198; 336/170; 336/208; 336/222; 363/21.04; 363/21.07; 363/171

(58) Field of Classification Search
USPC ......... 336/198, 208, 212, 220–222, 170, 188; 363/21.04, 21.03, 21.07, 171, 131, 132
See application file for complete search history.

(56) References Cited

U.S. PATENT DOCUMENTS 2,622,192 A * 12/1952 Tarpley .......................... 327/101
6,449,178 B1 * 9/2002 Sakai et al. .................... 363/131

(Continued)

FOREIGN PATENT DOCUMENTS

GB          2 447 324 A     9/2008
WO       WO 03/098788 A1   11/2003

OTHER PUBLICATIONS

Chen, P. et al., "The Passive EMI Cancellation Effects of Y Capacitor and CM Model of Transformers Used in Switching Mode Power Supplies (SMPS)," 35th Annual IEEE Power Electronics Specialists Conference, Aachen, Germany, 2004, pp. 1076-1079. (4 pages).

*Primary Examiner* — Alexander Talpalatski
*Assistant Examiner* — Mangtin Lian
(74) *Attorney, Agent, or Firm* — Blakely Sokoloff Taylor & Zafman LLP

(57) ABSTRACT

An energy transfer assembly with tuned leakage inductance and common mode noise compensation is disclosed. An example energy transfer assembly for use in a resonant power converter includes a first winding wound around a bobbin mounted on a magnetic core. The first winding has a first number of layers proximate to a first end along a length of the bobbin and a second number of layers proximate to a second end along the length of the bobbin. The energy transfer assembly also includes a second winding wound around the bobbin. The second winding has a third number of layers proximate to the first end along the length of the bobbin and a fourth number of layers proximate to the second end along the length of the bobbin. The first and second windings are wound around the bobbin such that at least a portion of one of the first and second windings overlaps at least a portion of another one of the first and second windings around the bobbin. A degree of overlap between the first and second windings is non-uniform between the first and second ends along the length of the bobbin such that a ratio of the first number to the third number does not equal a ratio of the second number to the fourth number.

33 Claims, 9 Drawing Sheets

(56) References Cited

U.S. PATENT DOCUMENTS

| | | | |
|---|---|---|---|
| 6,590,792 B2 * | 7/2003 | Owaki | 363/39 |
| 7,205,877 B2 | 4/2007 | Polivka et al. | |
| 7,236,077 B1 * | 6/2007 | Hsu et al. | 336/180 |
| 2003/0035304 A1 * | 2/2003 | Gu | 363/17 |
| 2010/0182803 A1 * | 7/2010 | Nan et al. | 363/21.02 |

* cited by examiner

ENERGY TRANSFER ASSEMBLY WITH TUNED LEAKAGE INDUCTANCE AND COMMON MODE NOISE COMPENSATION

BACKGROUND INFORMATION

1. Field of the Disclosure

The present invention relates generally to energy transfer. More specifically, the present invention relates to an energy transfer assembly that may be utilized in a resonant power converter.

2. Background

Transformers are used in electrical circuits as energy transfer elements to transfer energy from an input electrical circuit to an output electrical circuit through the magnetic field with electrical isolation. In general, a transformer includes a primary winding and a secondary winding. The primary winding is connected to an input circuit and the secondary winding is connected to an output circuit. The primary and secondary windings are wound across the length of a common bobbin mounted on a magnetic core. Since the magnetic permeability of the magnetic core material relative to the surrounding air is much higher, the main flux transmitting the energy in the transformer is through the magnetic field in the magnetic core. However, part of the magnetic flux of each winding also passes through the air around the same winding, which is often referred to as leakage flux and results in a self inductance known as leakage inductance. In some situations the leakage inductance of the transformer is considered an unwanted parasitic inductance, while in other situations, the leakage inductance of the transformer is actually utilized as part of a required inductance for an electrical circuit design.

In known transformers, the primary and secondary windings are typically wound on top of each other with full overlap, and with each of the primary and secondary windings covering substantially the entire bobbin length, including any marginal isolation if required. In other known transformers, the primary and secondary windings are wound side-by-side along the bobbin length with each of them covering some percentage of the bobbin length, including any marginal isolation if required.

When the primary and secondary windings are wound with a fully overlapped structure, the majority of the magnetic flux generated by each winding is common between the windings, and the leakage inductance is therefore minimized. In addition, when primary and secondary windings are fully overlapped, due to the electrical potential difference between the adjacent or nearby layers of the windings, a parasitic capacitive (Cparasitic) coupling path is created between the primary and secondary windings, which forms a low impedance path between the primary and secondary windings for the common mode (CM) noise that typically has a noise frequency in the upper range of MHz ($1/C_{parasitic}*\omega_{noise}$, where $\omega_{noise}=2\pi F_{noise}$ is the angular speed of the CM noise frequency). The CM noise travels simultaneously along both input lines and the path for their return to the source is through ground. The capacitive coupling between the primary and secondary provides a path for CM noise from the primary winding to the secondary winding and from the secondary through the parasitic capacitance of the secondary to ground through which the CM noise finds its way back to the input source. This causes an Electro Magnetic Interference (EMI) issue and may result in failures in Electro Magnetic Compliance (EMC) regulatory testing.

In transformers with primary and secondary windings that are wound in a side-by-side structure, the relative amount of the magnetic flux generated around each winding through the air is greater, and the leakage flux is increased compared to transformers with primary and secondary windings that are wound with fully overlapped structures. On the other hand, the capacitive coupling between the primary and secondary windings is minimized, which therefore results in minimized CM noise and EMI issues.

Switching converters often use transformers or other types of energy transfer elements. In HF switching converters, the transformer design is often a complicated task because as the frequencies of switching pulses increase, such as for example in the range of few hundred kHz, the role of transformer leakage impedance becomes more dominant ($L_{leakage}*\omega_{switch}$, where $\omega_{switch}$ is the angular speed of the switching frequency).

In addition, CM noise is also a concern in switching converters that have HF input square wave pulses. The sharp edges found in the HF input square wave pulses can result in very high frequency (VHF) noise (angular speed of $\omega_{noise}$) in the primary windings, which finds a return path through ground. For instance, in HF transformer isolated power supplies, the parasitic capacitive coupling between the winding layers forms a low impedance path ($1/C_{parasitic}*\omega_{noise}$). CM noise with VHF noise is conducted through the path from the primary winding to the secondary winding. Furthermore, noise from secondary winding finds its way back to the input ground through the parasitic capacitance of secondary winding to ground, which creates EMI noise problems that appear in EMI scans as high amplitude spikes at the harmonics of the switching frequency and is a common cause of failure in EMC regulatory tests.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1A:
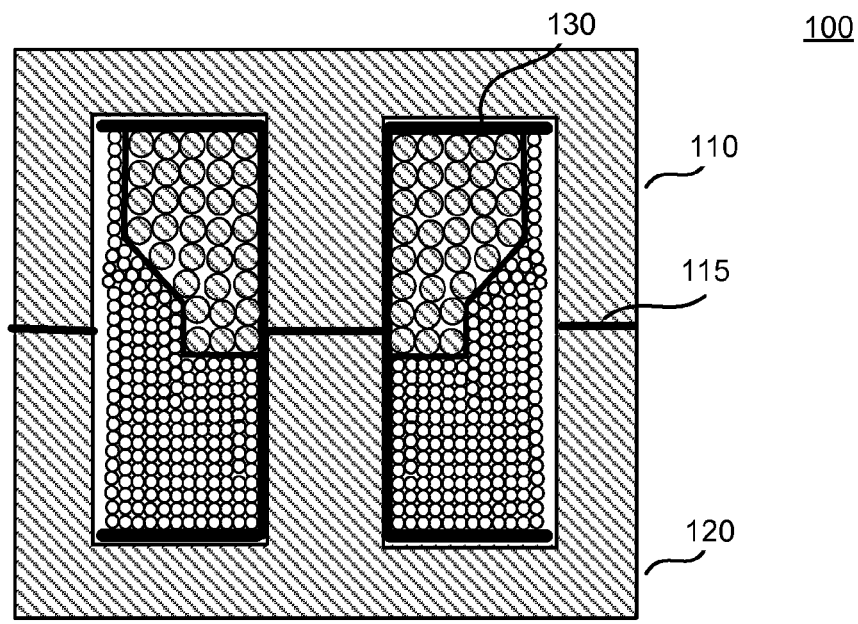
FIG. 1A shows generally a cross section of an example transformer including first and second windings wound around a bobbin mounted on a magnetic core in accordance with the teachings of the present invention.

Methods and apparatuses for implementing an energy transfer assembly with common mode noise cancellation circuitry in a power converter are described. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, an energy transfer assembly with partially overlapped windings is disclosed. In one example, CM noise cancellation circuitry is included in the energy transfer assembly, which compensates for CM noise introduced as a result of the partial overlapping of the windings in accordance with the teachings of the present invention. With the partial overlapping of the windings as disclosed herein, the degree of overlap between the windings is non-uniform and the leakage inductance of the energy transfer assembly can be designed or tuned to a desired amount. In some electrical designs, such as resonant circuits with transformer isolation, the tuned leakage inductance is utilized as the resonating inductance to save on component and space on the circuit board. As will be disclosed, the tuned leakage inductance of an example energy transfer assembly is utilized as part of a resonant LLC power converter in accordance with the teachings of the present invention.

An LLC converter is a switching power converter that uses a resonant circuit including a capacitance and two inductances. A resonance current through a HF transformer in the LLC converter is transferred to a load, which is coupled to an output of the LLC converter at secondary side. A capacitor of the resonant circuit and the low value leakage inductance of the transformer define a series resonance of higher frequency while the high value magnetic inductance and the capacitor of the resonant circuit define a lower frequency parallel resonance. The input voltage pulses to the resonant circuit, which may sometimes be referred to as a tank circuit, are square wave pulses that are chopped by a switching circuit, such as for example a half bridge circuit, at the input of the resonant circuit. In operation, the resonant current is a sinusoidal oscillation between the resonating inductors and the capacitor of the resonant circuit. The operating frequency of the LLC converter changes between the series and parallel resonance frequencies.

In a cost effective design of an LLC converter in accordance with the teachings of the present invention, the magnetizing inductance of the primary winding in a transformer of an energy transfer assembly is utilized for the parallel resonance that transfers the load power to the secondary to reduce component count, cost and size. In one example, the series resonance inductor of the LLC converter utilizes the leakage inductance of the primary winding. In one example, this leakage inductance of the primary winding of the energy transfer assembly is tuned to a desired amount by partially overlapping the primary and secondary windings in accordance with the teachings of the present invention. In the examples illustrated herein, the depicted transformers are HF multi layer transformers with partially overlapped winding structures, which make possible fine-tuning of the leakage inductance using different types of the partial overlapping between the primary and secondary windings in accordance with the teachings of the present invention.

To illustrate, FIG. 1A shows generally a cross section of an example transformer 100 including first and second windings wound around a bobbin mounted on a magnetic core of an energy transfer assembly in accordance with the teachings of the present invention. As shown, transformer 100 includes a bobbin 130 mounted on a magnetic core, which includes two halves 110 and 120, with an interface 115 between the two halves 110 and 120.

Figure 1B:
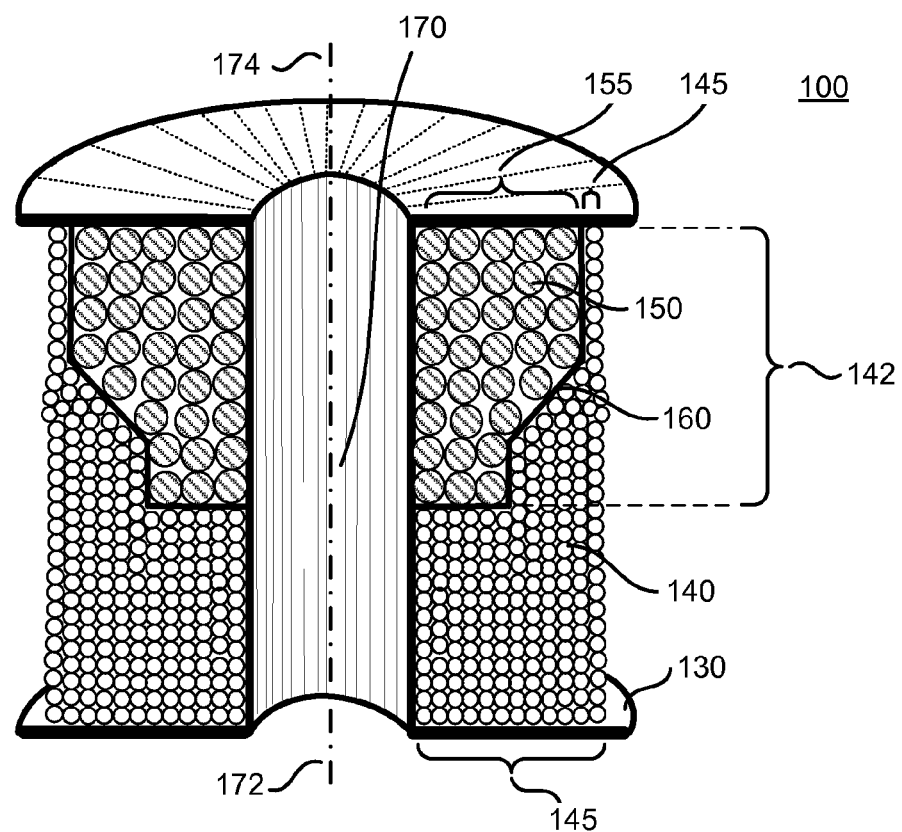
FIG. 1B shows generally a cross section of example first and second windings wound around a bobbin of a transformer in accordance with the teachings of the present invention.

FIG. 1B shows a cross section of one example of bobbin 130 and the windings wound around bobbin 130 in greater detail. As shown in the depicted example, bobbin 130 in one example is a cylindrical bobbin having an axis 170. It is appreciated that in other examples, bobbin 130 can have other shapes such as for example a square shape or other suitable type of axial bobbin. In one example, first and second windings 140 and 150 are wound around bobbin 130, which is mounted on a magnetic core. As shown, there is at least an overlapping portion 142 along axis 170 of bobbin 130 where one of the first and second windings 140 and 150 overlaps at least a portion of the other one of the first and second windings 140 and 150 around bobbin 130. In addition, FIG. 1B shows that the relative number of layers of first and second windings 140 and 150 wound around bobbin 130 is non-uniform along the length of axis 170 of bobbin 130. To illustrate, the example of FIG. 1B shows that first winding 140 has a first number of layers 145 proximate to a first end 172 of axis 170 along a length of bobbin 130. In the illustrated example, first winding 140 has a second number of layers 145 proximate to a second end 174 of axis 170 along the length of bobbin 130. Similarly, the second winding 150 has a third number of layers 155 proximate to the first end 172 of axis 170 along the length of the bobbin 130 and a fourth number of layers 155 proximate to the second end 174 of axis 170 along the length of the bobbin 130. In one example, one of the first and second windings 140 and 150 is a primary winding and the other one of the first and second windings 140 and 150 is a secondary winding. It is noted that in an example in which the second winding 150 is of lower voltage and higher current, the second winding 150 is introduced by thicker wires and a first winding 140 with higher voltage and lower current is introduced by thinner wires.

In particular, it is noted that in the specific example of FIG. 1B that there are twelve layers 145 of first winding 140 and zero layers 155 of second winding 150 proximate to first end 172 of axis 170 of bobbin 130. In addition, it is noted there is one layer 145 of first winding 140 and five layers 155 of second winding 150 proximate to second end 174 of axis 170 of bobbin 130. As such, a ratio of the number of layers 145 and 155 of the first winding 140 to the second winding 150 proximate to the first end 172 is twelve to zero. However, the ratio proximate to the second end 174 is one to five. Thus, there is a partial overlap between the first and second windings 140 and 150 as the degree of overlap between the first and second windings 140 and 150, or the relative number of layers 145 and 155, is non-uniform along the length of bobbin 130 between first and second ends 172 and 174. Indeed, the ratio of the number of layers 145 and 155 of the first and second windings 140 and 150 varies along the length of bobbin 130. For instance, the ratio of the number of layers 145 and 155 of the first and second windings 140 and 150 proximate to the first end 172 does not equal the ratio of the number of layers 145 and 155 of the first and second windings 140 and 150 proximate to the second end 174 in accordance with the teachings of the present invention.

It is appreciated of course that the actual numbers of layers may be different than those illustrated and that numbers shown in the drawings are for explanation purposes. In addition, the number of turns is not shown in any specific order and would vary depending on the specific design application. Furthermore, it is noted that for explanation purposes, the first and second windings 140 and 150 are illustrated as being solid with thinner and thicker cross sections. However, in other examples, each winding may include a plurality of wires and/or multi-strand wires may also be utilized in accordance with the teachings of the present invention. In addition, in other examples, the windings may include a plurality of portions and include a center-tap or the like in accordance with the teachings of the present invention.

Referring back to the example shown in FIG. 1B, it is noted that an isolation barrier 160 is also included between the first and second windings 140 and 150 and around bobbin 130 as shown. In the illustrated example, it is noted that isolation barrier 160 separates the windings of first winding 140 from the windings of second winding 150 around bobbin 130. In one example, the cross-section of isolation barrier 160 includes at least one portion that is sloped with respect to axis 170. In other words, in one example, the number of layers 145 or 155 between isolation barrier 160 and axis 170 varies along the length of the bobbin 130 such that a distance between isolation barrier 160 and the axis 170 varies along the length of bobbin 130 between first and second ends 172 and 174 in accordance with the teachings of the present invention.

Figure 2:
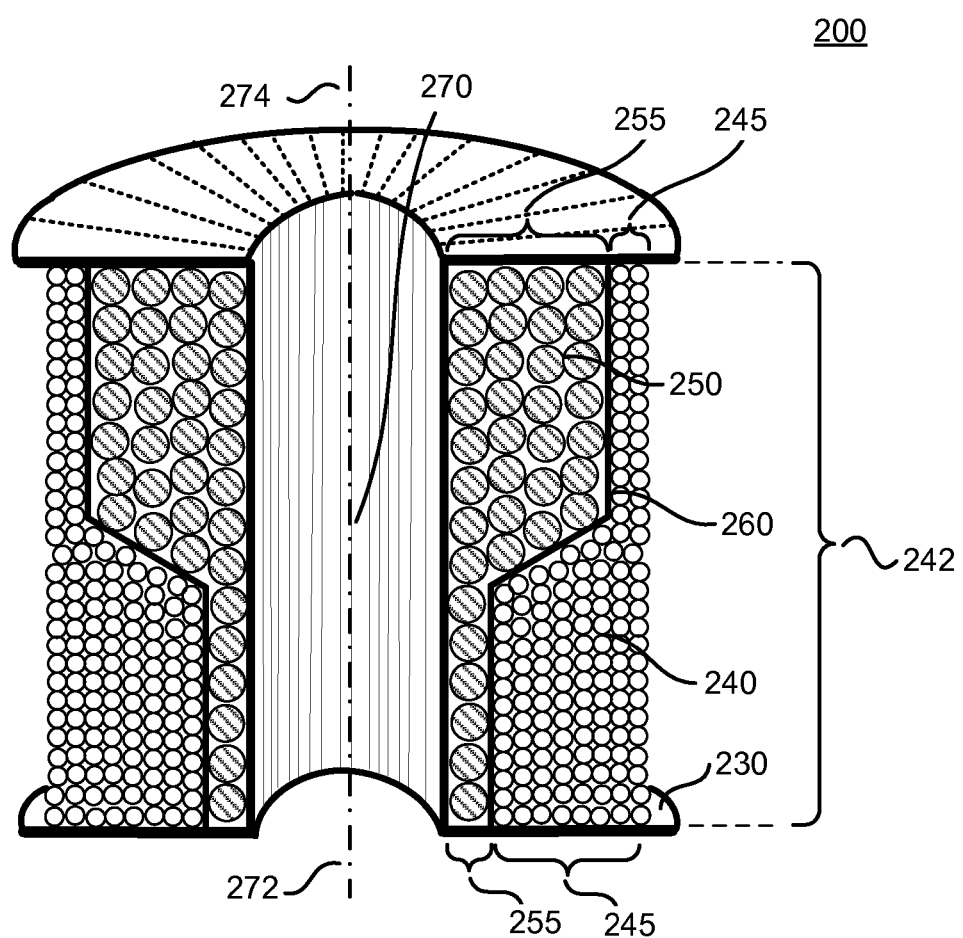
FIG. 2 shows generally a cross section of another example of first and second windings wound around a bobbin of a transformer in accordance with the teachings of the present invention.

FIG. 2 shows generally a cross section of another example of first and second windings wound around a bobbin 230 of a transformer 200 in accordance with the teachings of the present invention. It is noted that bobbin 230 of transformer 200 shares many similarities with bobbin 130 of transformer 100 illustrated in FIGS. 1A and 1B. For instance, bobbin 230 in one example is a cylindrical bobbin having an axis 270. It is appreciated that in other examples, bobbin 230 can have other shapes such as for example a square shape or other suitable type of axial bobbin. In one example, first and second windings 240 and 250 are wound around bobbin 230, which is mounted on a magnetic core. As shown, there is at least an overlapping portion 242 along axis 270 of bobbin 230 where one of the first and second windings 240 and 250 overlaps at least a portion of the other one of the first and second windings 240 and 250 around bobbin 230. In addition, FIG. 2 shows that the relative number of layers of first and second windings 240 and 250 wound around bobbin 230 is non-uniform along the length of axis 270 of bobbin 230. To illustrate, the example depicted in FIG. 2 shows that first winding 240 has first and second numbers of layers 245 proximate to first and second ends 272 and 274, respectively, of axis 270 along the length of bobbin 230. Similarly, second winding 230 has third and fourth numbers of layers 255 proximate to first and second ends 272 and 274, respectively, of axis 270 along the length of bobbin 230.

In particular, it is noted that in the specific example of FIG. 2 that there are eight layers 245 of first winding 240 and one layer 255 of second winding 250 proximate to first end 272 of axis 270 of bobbin 230. In addition, it is noted there are two layers 245 of first winding 240 and four layers 255 of second winding 250 proximate to second end 274 of axis 270 of bobbin 230. As such, a ratio of the number of layers 245 and 255 of the first winding 240 to the second winding 250 proximate to the first end 272 is eight to one. However, the ratio proximate to the second end 274 is two to four. Thus, there is a partial overlap between the first and second windings 240 and 250 as the degree of overlap between the first and second windings 240 and 250, or the relative number of layers 245 and 255, is non-uniform along the length of the bobbin 230 between the first and second ends 272 and 274. Indeed, the ratio of the number of layers 245 and 255 of the first and second windings 240 and 250 varies along the length of bobbin 230. For instance, the ratio of the number of layers 245 and 255 of the first and second windings 240 and 250 proximate to the first end 272 does not equal the ratio of the number of layers 245 and 255 of the first and second windings 240 and 250 proximate to the second end 274 in accordance with the teachings of the present invention.

In the example shown in FIG. 2, it is noted that an isolation barrier 260 is also included between the first and second windings 240 and 250 and around bobbin 230 as shown. In the illustrated example, it is noted that isolation barrier 260 separates the windings of first winding 240 from the windings of second winding 250 around bobbin 230. In one example, the cross-section of isolation barrier 260 includes at least one portion that is sloped with respect to axis 270. In other words, in one example, the number of layers 245 or 255 between isolation barrier 260 and axis 270 varies along the length of the bobbin 230 such that a distance between isolation barrier 260 and the axis 270 varies along the length of bobbin 230 between first and second ends 272 and 274 in accordance with the teachings of the present invention.

Figure 3:
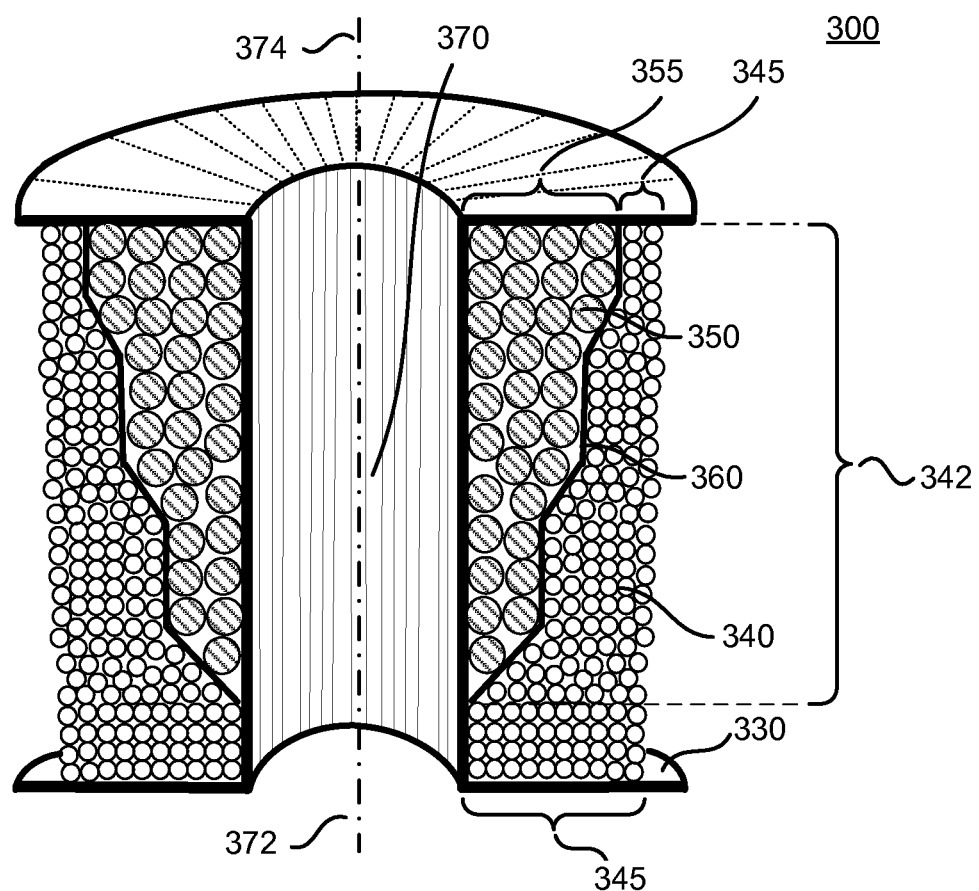
FIG. 3 shows generally a cross section of yet another example of first and second windings wound around a bobbin of a transformer in accordance with the teachings of the present invention.

FIG. 3 shows generally a cross section of yet another example of first and second windings wound around a bobbin 330 of a transformer 300 in accordance with the teachings of the present invention. It is noted that bobbin 330 of transformer 300 shares many similarities with bobbins 130 and 230 of transformers 100 and 200, respectively, illustrated in FIGS. 1-2. For instance, bobbin 330 in one example is a cylindrical bobbin having an axis 370. It is appreciated that in other examples, bobbin 330 can have other shapes such as for example a square shape or other suitable type of axial bobbin. In one example, first and second windings 340 and 350 are wound around bobbin 330, which is mounted on a magnetic core. As shown, there is at least an overlapping portion 342 along axis 370 of bobbin 330 where one of the first and second windings 340 and 350 overlaps at least a portion of the other one of the first and second windings 340 and 350 around bobbin 330. In addition, FIG. 3 shows that the relative number of layers of first and second windings 340 and 350 wound around bobbin 330 is non-uniform along the length of axis 370 of bobbin 330. To illustrate, the example depicted in FIG. 3 shows that first winding 340 has first and second numbers of layers 345 proximate to first and second ends 372 and 374, respectively, of axis 370 along the length of bobbin 330. Similarly, second winding 350 has third and fourth numbers of layers 355 proximate to first and second ends 372 and 374, respectively, of axis 370 along the length of bobbin 330.

In particular, it is noted that in the specific example of FIG. 3 that there are ten layers 345 of first winding 340 and zero layers 355 of second winding 350 proximate to first end 372 of axis 370 of bobbin 330. In addition, it is noted there are two layers 345 of first winding 340 and four layers 355 of second winding 350 proximate to second end 374 of axis 370 of bobbin 330. As such, a ratio of the number of layers 345 and 355 of the first winding 340 to the second winding 350 proximate to the first end 372 is ten to zero. However, the ratio proximate to the second end 374 is two to four. Thus, there is a partial overlap between the first and second windings 340 and 350 as the degree of overlap between the first and second windings 340 and 350, or the relative number of layers 345 and 355, is non-uniform along the length of the bobbin 330 between the first and second ends 372 and 374. Indeed, the ratio of the number of layers 345 and 355 of the first and second windings 340 and 350 varies along the length of bobbin 330. For instance, the ratio of the number of layers 345 and 355 of the first and second windings 340 and 350 proximate to the first end 372 does not equal the ratio of the number of layers 345 and 355 of the first and second windings 340 and 350 proximate to the second end 374 in accordance with the teachings of the present invention.

In the example shown in FIG. 3, it is noted that an isolation barrier 360 is also included between the first and second windings 340 and 350 and around bobbin 330 as shown. In the illustrated example, it is noted that isolation barrier 360 separates the windings of first winding 340 from the windings of second winding 350 around bobbin 330. In one example, the cross-section of isolation barrier 360 includes at least one portion that is sloped with respect to axis 370. In other words, in one example, the number of layers 345 or 355 between isolation barrier 360 and axis 370 varies along the length of the bobbin 330 such that a distance between isolation barrier 360 and the axis 370 varies along the length of bobbin 330 between the first and second ends 372 and 374 in accordance with the teachings of the present invention.

Figure 4:
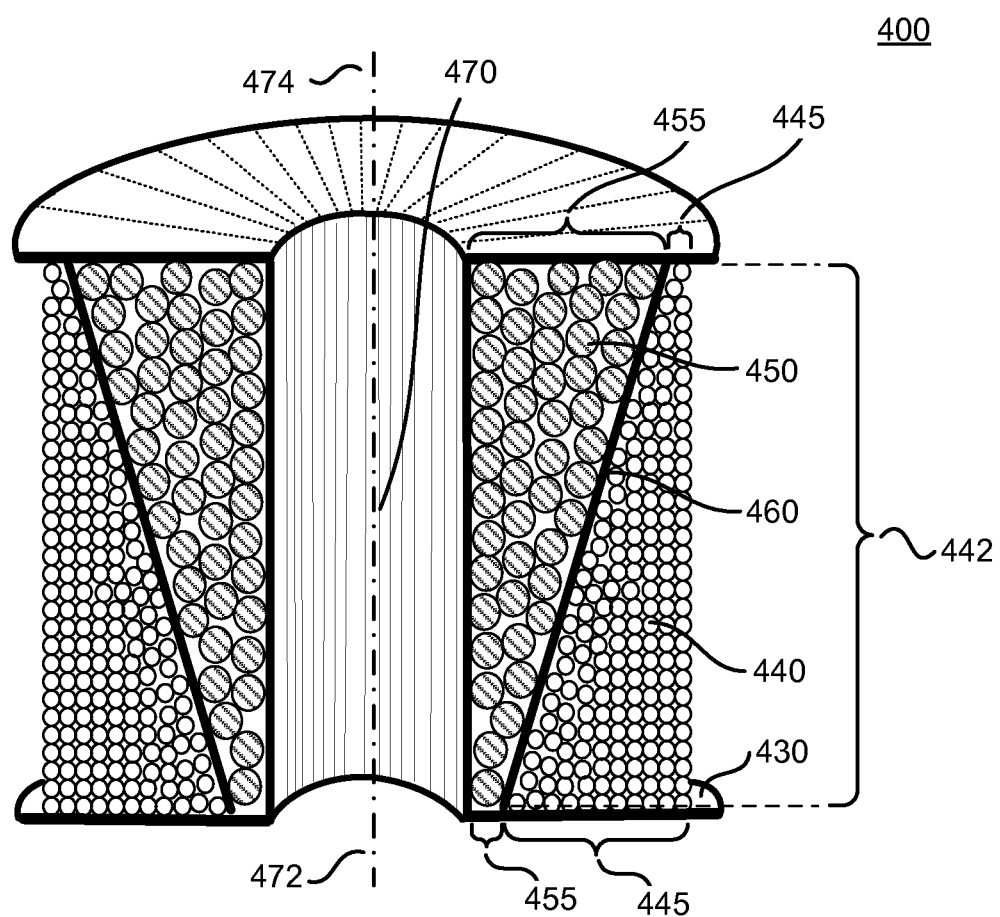
FIG. 4 shows generally a cross section of still another example of first and second windings wound around a bobbin of a transformer in accordance with the teachings of the present invention.

FIG. 4 shows generally a cross section of still another example of first and second windings wound around a bobbin 430 of a transformer in accordance with the teachings of the present invention. It is noted that bobbin 430 of transformer 400 shares many similarities with bobbins 130, 230 and 330 of transformers 100, 200 and 300, respectively, illustrated in FIGS. 1-3. For instance, bobbin 430 in one example is a cylindrical bobbin having an axis 470. It is appreciated that in other examples, bobbin 430 can have other shapes such as for example a square shape or other suitable type of axial bobbin. In one example, first and second windings 440 and 450 are wound around bobbin 430, which is mounted on a magnetic core. As shown, there is at least an overlapping portion 442 along axis 470 of bobbin 430 where one of the first and second windings 440 and 450 overlaps at least a portion of the other one of the first and second windings 440 and 450 around bobbin 430. In addition, FIG. 4 shows that the relative number of layers of first and second windings 440 and 450 wound around bobbin 430 is non-uniform along the length of axis 470 of bobbin 430. To illustrate, the example depicted in FIG. 4 shows that first winding 440 has first and second numbers of layers 445 proximate to first and second ends 472 and 474, respectively, of axis 470 along the length of bobbin 430. Similarly, second winding 450 has third and fourth numbers of layers 455 proximate to first and second ends 472 and 474, respectively, of axis 470 along the length of bobbin 430.

In particular, it is noted that in the specific example of FIG. 4 that there are eleven layers 445 of first winding 440 and one layer 455 of second winding 450 proximate to first end 472 of axis 470 of bobbin 430. In addition, it is noted there is one layer 445 of first winding 440 and five layers 455 of second winding 450 proximate to second end 474 of axis 470 of bobbin 430. As such, a ratio of the number of layers 445 and 455 of the first winding 440 to the second winding 450 proximate to the first end 472 is eleven to one. However, the ratio proximate to the second end 474 is one to five. Thus, there is a partial overlap between the first and second windings 440 and 450 as the degree of overlap between the first and second windings 440 and 450 is non-uniform along the length of the bobbin 430 between the first and second ends 472 and 474. Indeed, the ratio of the number of layers 445 and 455 of the first and second windings 440 and 450, or the relative number of layers 445 and 455, is non-uniform along the length of bobbin 430 between the first and second ends 445 and 455. For instance, the ratio of the number of layers 445 and 455 of the first and second windings 440 and 450 proximate to the first end 472 does not equal the ratio of the number of layers 445 and 455 of the first and second windings 440 and 450 proximate to the second end 474 in accordance with the teachings of the present invention.

In the example shown in FIG. 4, it is noted that an isolation barrier 460 is also included between the first and second windings 440 and 450 and around bobbin 430 as shown. In the illustrated example, it is noted that isolation barrier 460 separates the windings of first winding 440 from the windings of second winding 450 around bobbin 430. In one example, the cross-section of isolation barrier 460 includes at least one portion that is sloped with respect to axis 470. In other words, in one example, the number of layers 445 or 455 between isolation barrier 460 and axis 470 varies along the length of the bobbin 430 such that a distance between isolation barrier 460 and the axis 470 varies along the length of bobbin 430 between first and second ends 472 and 474 in accordance with the teachings of the present. In fact, in the specific example illustrated in FIG. 4, the isolation barrier 460 forms a conic interface between the first and second windings 450 and 460 as the cross-section of the entire isolation barrier 460 is sloped with respect to axis 470.

Figure 5:
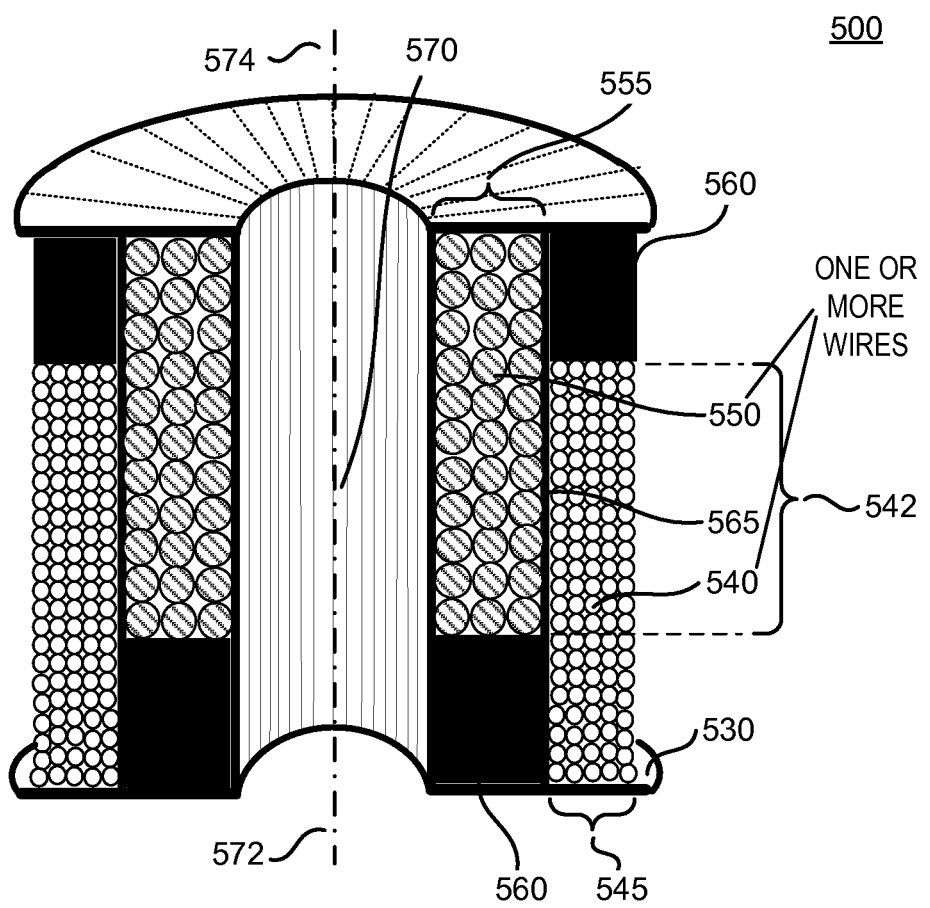
FIG. 5 shows generally a cross section of still yet another example of first and second windings wound around a bobbin of a transformer in accordance with the teachings of the present invention.

FIG. 5 shows generally a cross section of still yet another example of first and second windings wound around a bobbin 530 of a transformer in accordance with the teachings of the present invention. It is noted that bobbin 530 of transformer 500 shares many similarities with bobbins 130, 230, 330 and 430 of transformers 100, 200, 300 and 400, respectively, illustrated in FIGS. 1-4. For instance, bobbin 530 in one example is a cylindrical bobbin having an axis 570. It is appreciated that in other examples, bobbin 530 can have other shapes such as for example a square shape or other suitable type of axial bobbin. In one example, first and second windings 540 and 550 are wound around bobbin 530, which is mounted on a magnetic core. As shown, there is at least an overlapping portion 542 along axis 570 of bobbin 530 where one of the first and second windings 540 and 550 overlaps at least a portion of the other one of the first and second windings 540 and 550 around bobbin 530. In addition, FIG. 5 shows that the relative number of layers of first and second windings 540 and 550 would around bobbin 540 is non-uniform along the length of axis 570 of bobbin 530. To illustrate, the example depicted in FIG. 5 shows that first winding 540 has first and second numbers of layers 545 proximate to first and second ends 572 and 574, respectively, of axis 570 along the length of bobbin 530. Similarly, second winding 550 has third and fourth numbers of layers 555 proximate to first and second ends 572 and 574, respectively, of axis 570 along the length of bobbin 530.

In particular, it is noted that in the specific example of FIG. 5 that there are five layers 545 of first winding 540 and zero layers 555 of second winding 550 proximate to first end 572 of axis 570 of bobbin 530. In addition, it is noted there are zero layers 545 of first winding 540 and three layers 555 of second winding 550 proximate to second end 574 of axis 570 of bobbin 530. As such, a ratio of the number of layers 545 and 555 of the first winding 540 to the second winding 550 proximate to the first end 572 is five to zero. However, the ratio proximate to the second end 574 is zero to three. Thus, there is a partial overlap between the first and second windings 540 and 550 as the degree of overlap between the first and second windings 540 and 550 is non-uniform along the length of the bobbin 530 between the first and second ends 572 and 574. Indeed, the ratio of the number of layers 545 and 555 of the first and second windings 540 and 550, or the relative number of layers 545 and 555 is non-uniform along the length of bobbin 530 between the first and second ends 545 and 555. For instance, the ratio of the number of layers 545 and 555 of the first and second windings 540 and 550 proximate to the first end 572 does not equal the ratio of the number of layers 545 and 555 of the first and second windings 540 and 550 proximate to the second end 574 in accordance with the teachings of the present invention.

In the example shown in FIG. 5, it is noted that an isolation barrier 565 separates the windings of first winding 540 from the windings of second winding 550 around bobbin 530 as shown. In the illustrated example, it is noted that isolation barrier 560 is included at opposite ends that also serves to provide creepage for each winding. In the illustrated example, it is noted that the partial overlap of first and second windings 540 and 550 is such that at the inner side of the bobbin, all of the second winding 550 layers 555 from the second end 574 of bobbin 530 occupy a fixed percentage of the bobbin length and the rest of bobbin length is filled with isolation barrier 560 proximate to the first end 572 as shown. Similarly, the first winding 545 layers 545 on the outer side of bobbin 530 starting from the first end 572 of bobbin 530 occupy a fixed percentage of the bobbin length so that at the middle there is a partial overlap between the first and second windings 540 and 550 and the unoccupied length of bobbin 530 is filled with isolation barrier 560 proximate to first and second ends 572 and 574 as shown.

Figure 6:
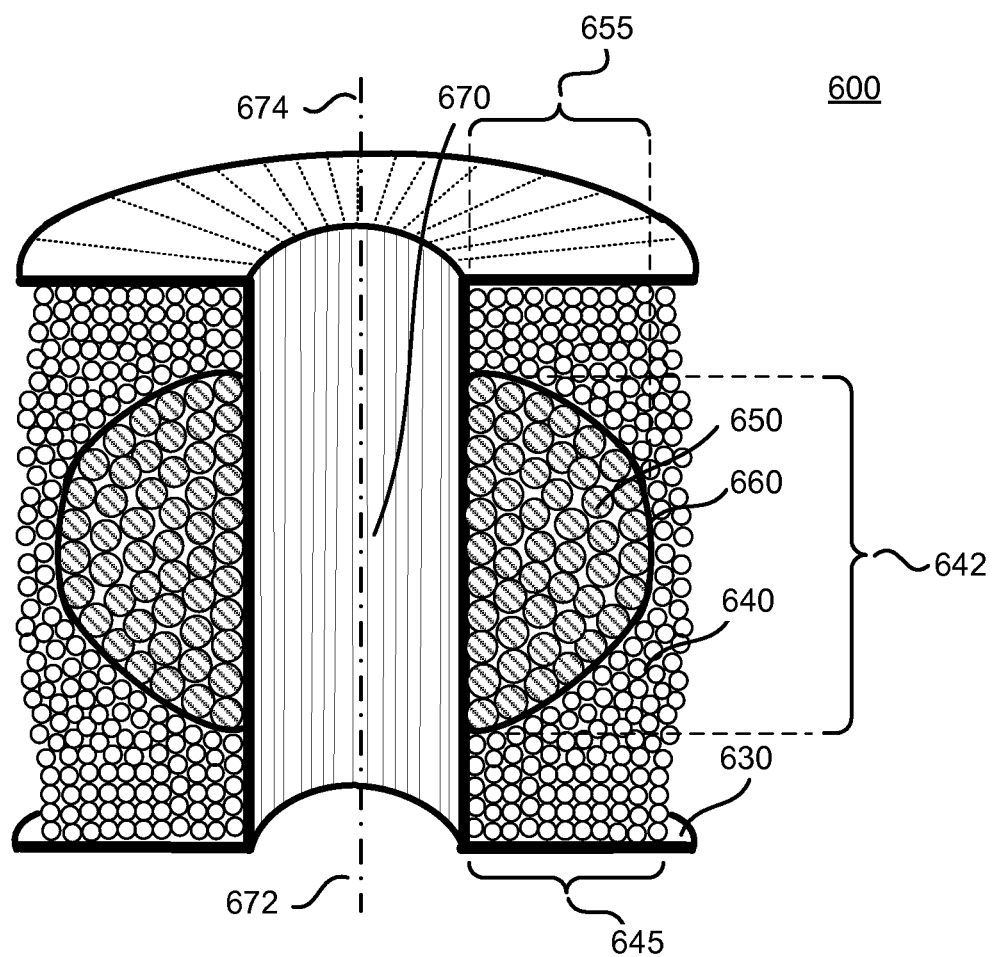
FIG. 6 shows generally a cross section of yet another example of first and second windings wound around a bobbin of a transformer in accordance with the teachings of the present invention.

FIG. 6 shows generally a cross section of yet another example of first and second windings wound around a bobbin 630 of a transformer in accordance with the teachings of the present invention. It is noted that bobbin 630 of transformer 600 shares many similarities with bobbins 130, 230, 330, 430 and 530 of transformers 100, 200, 300, 400 and 500, respectively, illustrated in FIGS. 1-5. For instance, bobbin 630 in one example is a cylindrical bobbin having an axis 670. It is appreciated that in other examples, bobbin 630 can have other shapes such as for example a square shape or other suitable type of axial bobbin. In one example, first and second windings 640 and 650 are wound around bobbin 630, which is mounted on a magnetic core. As shown, there is at least an overlapping portion 642 along axis 670 of bobbin 630 where one of the first and second windings 640 and 650 overlaps at least a portion of the other one of the first and second windings 640 and 650 around bobbin 4630. In addition, FIG. 6 shows that the relative number of layers of first and second windings 640 and 650 wound around bobbin 630 varies along the length of axis 670 of bobbin 630. To illustrate, the example depicted in FIG. 6 shows that first winding 640 has a number of layers 645 proximate to first and second ends 672 and 674, respectively, of axis 670 along the length of bobbin 630. Similarly, second winding 650 has a number of layers 655 proximate to the center of axis 670 along the length of bobbin 630 between first and second ends 672 and 674.

In particular, it is noted that in the specific example of FIG. 6 that there are eleven layers 645 of first winding 640 and zero layers 655 of second winding 650 proximate to first and second ends 672 and 674, respectively, of axis 670 of bobbin 630. However, it is noted there are approximately two layers 645 of first winding 640 and six layers 655 of second winding 650 proximate to the center of axis 670 of bobbin 630 between first and second ends 672 and 674. As such, a ratio of the number of layers 645 and 655 of the first winding 640 to the second winding 650 varies along the length of axis 670 between first and second ends 672 and 674. Thus, there is a partial overlap between the first and second windings 640 and 650 as the degree of overlap between the first and second windings 640 and 650 is non-uniform along the length of the bobbin 630 between the first and second ends 672 and 674. Indeed, the ratio of the number of layers 645 and 655 of the first and second windings 640 and 650, or the relative number of layers 645 and 655, is non-uniform along the length of bobbin 630 between the first and second ends 645 and 655. For instance, the ratio of the number of layers 645 and 655 of the first and second windings 640 and 650 at the first and second ends 672 and 674 does not equal the ratio of the number of layers 645 and 655 of the first and second windings 640 and 650 proximate to the center of axis 670 along the length of bobbin 630 between first and second ends 672 and 674 in accordance with the teachings of the present invention.

In the example shown in FIG. 6, it is noted that an isolation barrier 660 is also included between the first and second windings 640 and 650 and around bobbin 630 as shown. In the illustrated example, it is noted that isolation barrier 660 separates the windings of first winding 640 from the windings of second winding 650 around bobbin 630. In one example, the cross-section of isolation barrier 660 includes at least one portion that is sloped with respect to axis 670. In other words, in one example, the number of layers 645 or 655 between isolation barrier 660 and axis 670 varies along the length of the bobbin 630 such that a distance between isolation barrier 660 and the axis 670 varies along the length of bobbin 630 between first and second ends 672 and 674 in accordance with the teachings of the present.

As mentioned, the transformer examples described herein with partially overlapped first and second windings may be included in an energy transfer assembly for use in an LLC resonant converter that utilizes multi-layer windings with a center-tapped secondary. It is appreciated that the examples discussed above in FIGS. 1-6 illustrate the teachings of the present invention by example and not limitation and that the present invention should not be limited to the specific examples discussed herein and may include other structures with partial overlapping in accordance with the teachings of the present invention.

In the examples, the leakage inductance of the primary winding of the energy transfer assembly is tuned to a desired amount by partially overlapping the primary and secondary windings using structures and techniques as described. In the examples illustrated herein, the depicted transformers are HF multi layer transformers with partially overlapped winding structures, which make possible fine-tuning of the leakage inductance of the primary or secondary windings in accordance with the teachings of the present invention.

It is noted, however, that due to the electrical potential difference between nearby overlapped layers of windings, some additional capacitive coupling between the first and second windings is also formed, which could result in increased CM noise transmission to the secondary winding. In addition, noise may also be transmitted through the secondary parasitic capacitance to the ground back to the input, which impacts EMI performance of the converter.

As will be discussed below, CM noise cancellation circuitry is included in the new energy transfer assembly of the present invention to compensate for the additional CM noise due to the partially overlapped windings. Examples of the CM noise cancellation circuitry disclosed herein provide cost effective new solutions that utilize the bypass capacitive impedances from secondary to the input return. In one example, the CM noise cancellation circuitry injects anti-phase noise current back to the input return, which compensates for the transmitted CM noise due to the partially overlapped primary and secondary winding of the transformer in accordance with the teachings of the present invention.

Figure 7:
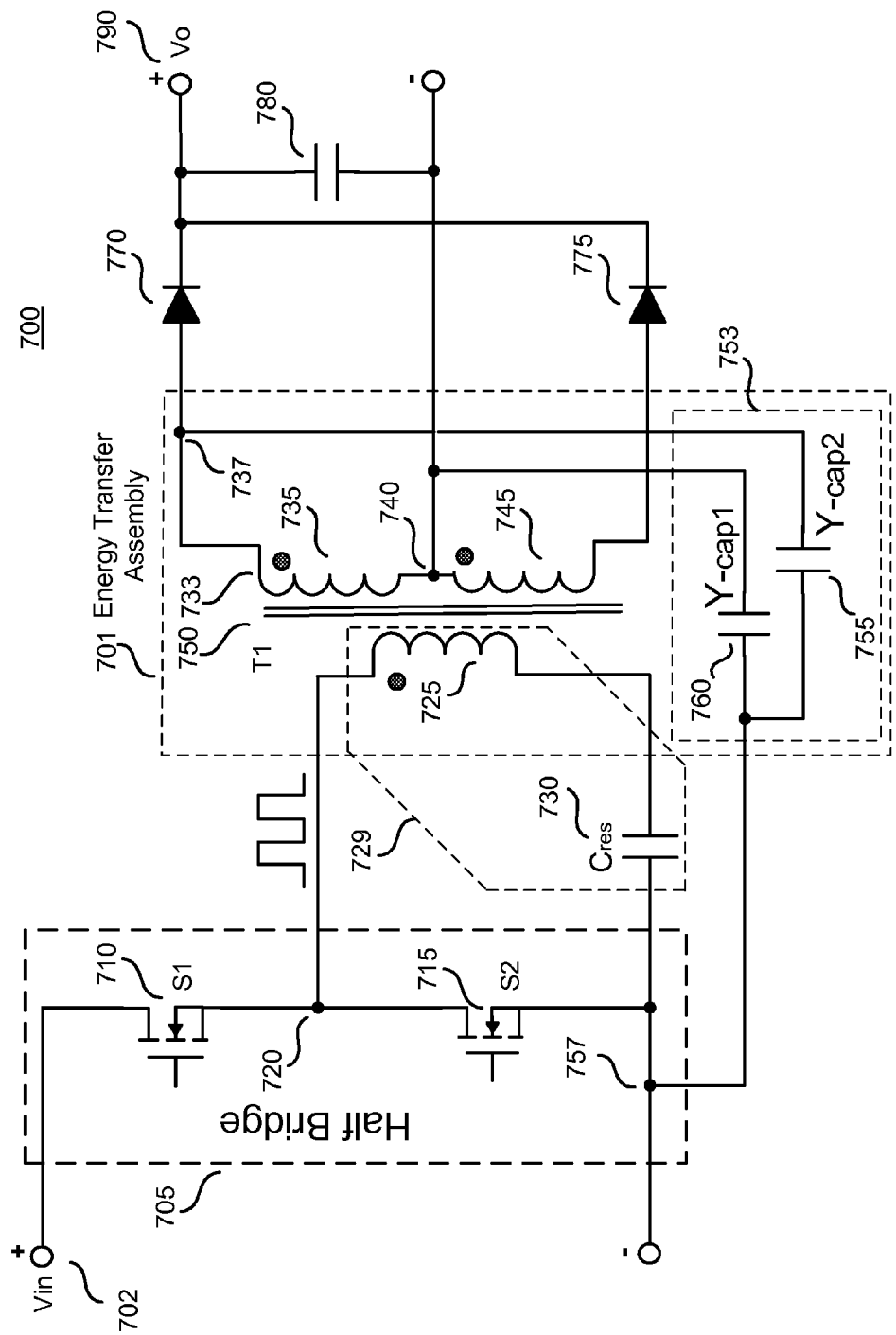
FIG. 7 is a schematic illustrating an example power converter including an energy transfer assembly and common mode noise cancellation circuit in accordance with the teachings of the present invention.

To illustrate, FIG. 7 is a schematic illustrating an example power converter 700 including an energy transfer assembly and common mode noise cancellation circuit in accordance with the teachings of the present invention. In the illustrated example, power converter 700 is an LLC resonant converter including an energy transfer element 701 coupled between an input 702 and an output 790 of the power converter 700. In one example, a switching circuit 705, which is shown as a half bridge circuit, is coupled between input 702 and energy transfer assembly 701. As shown in the depicted example, switching circuit 705 includes an upper switch S1 710 coupled to a lower switch S2 715, with a center node 720 between upper switch S1 710 and lower switch S2 715. In one example, switching circuit 705 receives input voltage Vin at input 702 and applies HF square-wave voltage pulses from center node 720 to a resonant circuit 729 coupled to switching circuit 705.

In the example depicted in FIG. 7, energy transfer assembly 701 includes transformer 750, which includes a primary winding 725 and a secondary winding 733 having a center-tap 740 between secondary winding portions 735 and 745. In one example, any one of the transformers 100, 200, 300, 400, 500 or 600 of FIGS. 1-6 having tuned leakage inductance with partially overlapped windings may be used in place of transformer 750 in accordance with the teachings of the present invention. As shown in the illustrated example, resonant circuit 729 includes a capacitor Cres 730 and two inductances that are provided by transformer 750, which include the internal magnetic inductance of transformer 750 and the leakage inductance of primary winding 725. In particular, the first inductance is the high value magnetic inductance formed with primary winding 725 and the core, which forms a parallel resonance with Cres 730 and transfers the load current to the secondary side. The second inductance of small value that defines the HF series resonance is the primary leakage inductance of transformer 750 through the air with the fine tuning, by the partial overlapping of the primary and secondary windings 725 and 733 of transformer 750, as described above in FIGS. 1-6. In the illustrated example, power converter 700 also includes diode 770 coupled to an output terminal 737 of secondary winding portion 735 and a diode 775 coupled to secondary winding portion 745 as shown. A capacitor 780 is also coupled between the output 790 of power converter 700 and the secondary return terminal coupled to center-tap 740 of secondary winding 733.

As shown in FIG. 7, power converter 700 also includes a CM noise cancellation circuit 753 coupled between secondary winding 733 of transformer 750 and an input return terminal 757 coupled to switching circuit 705 and to primary winding 725 of transformer 750 through capacitor Cres 730. In the specific example illustrated in FIG. 7, CM noise cancellation circuit 753 includes a first capacitive coupling 760, shown as Y-cap 1, coupled between an input return terminal 757 and a secondary return terminal coupled to center-tap 740 of the secondary winding 733. CM noise cancellation circuit 753 also includes a second capacitive coupling 755, shown as Y-cap 2, coupled between the input return terminal 757 and an output terminal 737 of secondary winding portion 735. In the illustrated example, the output terminal 737 is the in-phase output terminal of secondary winding portion 735 that is in phase with the primary input terminal of primary winding 725 coupled to receive the square wave from center node 720 of the switching circuit 705.

It is appreciated that the example shown in FIG. 7, two parallel CM bypass impedance paths introduced by first and second capacitive couplings 760 and 755. In one example, Y-cap 1, of first capacitive coupling 760 has a higher capacitance value and Y-cap 2, of second capacitive coupling 755 has a smaller capacitance value, which in one example is 220 pF to 2.2 nF. It is appreciated that by having a smaller capacitance value, Y-cap 2 has lower cost. In one example, the value of the smaller Y-cap 2 capacitor 755 is tuned to cancel out the CM noise at the input. In operation, the CM noise coupling due to the parasitic capacitance of the partially overlapped layers of transformer 750 is compensated by the anti-phase component of the noise bypassed from secondary winding 733 to the input return terminal 757 through the two bypass impedances provided by first and second capacitive couplings 760 and 755. The first bypass impedance is the first capacitive coupling 760 coupled from the center-tap 740 and the second bypass impedance is the second capacitive coupling 755 coupled from the output terminal 737 that is in phase with the square wave to the input return 757 coupled to switching circuit 705. The second bypass impedance provided by second capacitive coupling 755 provides a second bypass path for the extra CM noise transfer due to the partially windings in transformer 750 overlap for leakage tuning.

Figure 8:
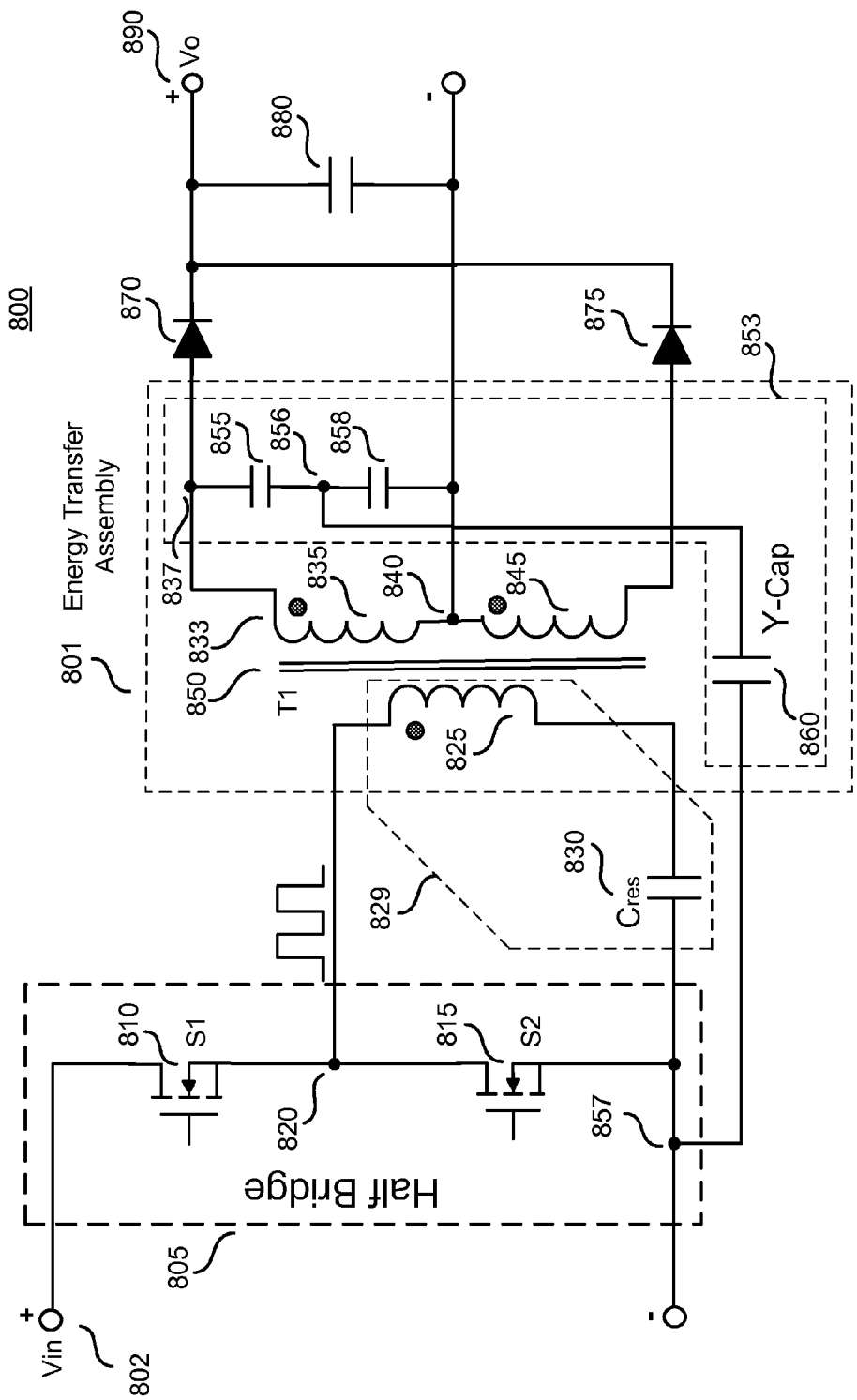
FIG. 8 is a schematic illustrating another example of a power converter including an energy transfer assembly and common mode noise cancellation in accordance with the teachings of the present invention.

FIG. 8 is a schematic illustrating another example of a power converter 800 including an energy transfer assembly and common mode noise cancellation in accordance with the teachings of the present invention. It is appreciated that power converter 800 shares many similarities with power converter 700 of FIG. 7. For instance, power converter 800 is an LLC resonant converter including an energy transfer element 801 coupled between an input 802 and an output 890 of the power converter 800. In one example, a switching circuit 805, which is shown as a half bridge circuit, is coupled between input 802 and energy transfer assembly 801. As shown in the depicted example, switching circuit 805 includes an upper switch S1 810 coupled to a lower switch S2 815, with a center node 820 between upper switch S1 810 and lower switch S2 815. In one example, switching circuit 805 receives input voltage Vin at input 802 and applies HF square-wave voltage pulses from center node 820 to a resonant circuit 829 coupled to switching circuit 805.

In the example depicted in FIG. 8, energy transfer assembly 801 includes transformer 850, which includes a primary winding 825 and a secondary winding 833 having a center-tap 840 between secondary winding portions 835 and 845. In one example, any one of the transformers 100, 200, 300, 400, 500 or 600 of FIGS. 1-6 having tuned leakage inductance with partially overlapped windings may be used in place of transformer 850 in accordance with the teachings of the present invention. As shown in the illustrated example, resonant circuit 829 includes a capacitor Cres 830 and two inductances that are provided by transformer 850, which include the internal magnetic inductance of transformer 850 and the leakage inductance of primary winding 825. In particular, the first inductance is the high value magnetic inductance formed with primary winding 825 and the core, which forms a parallel resonance with Cres 830 and transfers the load current to the secondary side. The second inductance of small value that defines the HF series resonance is the primary leakage inductance of transformer 850 through the air with the fine tuning, by the partial overlapping of the primary and secondary windings 825 and 833 of transformer 850, as described above in FIGS. 1-6. In the illustrated example, power converter 800 also includes diode 870 coupled to an output terminal 837 of secondary winding portion 835 and a diode 875 coupled to secondary winding portion 845 as shown. A capacitor 880 is also coupled between the output 890 of power converter 800 and the secondary return terminal coupled to center-tap 840 of secondary winding 833.

As shown in FIG. 8, power converter 800 also includes a CM noise cancellation circuit 853 coupled between secondary winding 833 of transformer 850 and an input return terminal 857 coupled to switching circuit 805 and to primary winding 825 of transformer 850 through capacitor Cres 830. In the specific example illustrated in FIG. 8, CM noise cancellation circuit 853 includes a first capacitive coupling, which includes Y-cap capacitor 860 and non-Y-cap capacitor 858 coupled between an input return terminal 857 and a secondary return terminal coupled to center-tap 840 of the secondary winding 833. CM noise cancellation circuit 853 also includes a second capacitive coupling, which includes Y-cap capacitor 860 and non-Y-cap capacitor 855 coupled between the input return terminal 857 and an output terminal 837 of secondary winding portion 835. In the illustrated example, the output terminal 837 is the in-phase output terminal of secondary winding portion 835 that is in phase with the primary input terminal of primary winding 825 coupled to receive the square wave pulses from center node 820 of the switching circuit 805. It is appreciated that non-Y-cap capacitors 855 and 858 of FIG. 8 are stacked between the output terminal 837 and center-tap terminal 840, and that Y-cap capacitor 860 is coupled to node 856 coupled between non-Y-cap capacitors 855 and 858 as shown. In the illustrated example, the impedances introduced across the secondary or from secondary to primary are very high and have no effect on operation while at very high frequency of noise they become conducting path for noise transmission.

It is appreciated that in the example shown in FIG. 8, CM noise cancellation circuit 853 utilizes two inexpensive non-Y-cap capacitors 855 and 858 coupled across the secondary winding portion 835 and a bypass Y-cap capacitor 860 coupled to the input return terminal 857 instead of using two higher cost Y-cap capacitors from secondary winding portion 835 to the input return, as included in power converter 700 of FIG. 7. As shown, the two small non-Y-cap capacitors 855 and 858 are coupled across the secondary winding portion 845. The two small non-Y-cap capacitors 855 and 858 form a divider with the center node 856 coupled to a higher value CM noise bypass Y-cap capacitor 860.

As shown in the example illustrated in FIG. 8, the CM noise bypass paths from output terminal 837 and center-tap 840 of secondary winding portion 835 are through the two capacitive couplings formed with non-Y-cap capacitor 855 coupled to Y-cap capacitor 860 and through non-Y-cap capacitor 858 coupled to Y-cap capacitor 860. The equivalent capacitance in each capacitive coupling path would be a smaller value than capacitor 855 and Y-cap capacitor 860 or of a smaller value than capacitor 858 and Y-cap capacitor 860. In addition, the impedance of the capacitive coupling including Y-cap capacitor 860 and non-Y-cap capacitor 858 would be less than the impedance of the capacitive coupling including Y-cap capacitor 860 and non-Y-cap capacitor 855.

This structure, while using only one Y-cap capacitor 860 provides improved CM noise cancellation to comply with EMC requirements in accordance with the teachings of the present invention. A potential disadvantage, however, of the CM noise cancellation circuit 853 structure is the risk of high frequency ringing between the two small non-Y-cap capacitors 855 and 858 across the secondary winding portion 835 and the secondary winding leakage that is in the bandwidth of EMI and could potentially case an EMC failure.

Figure 9:
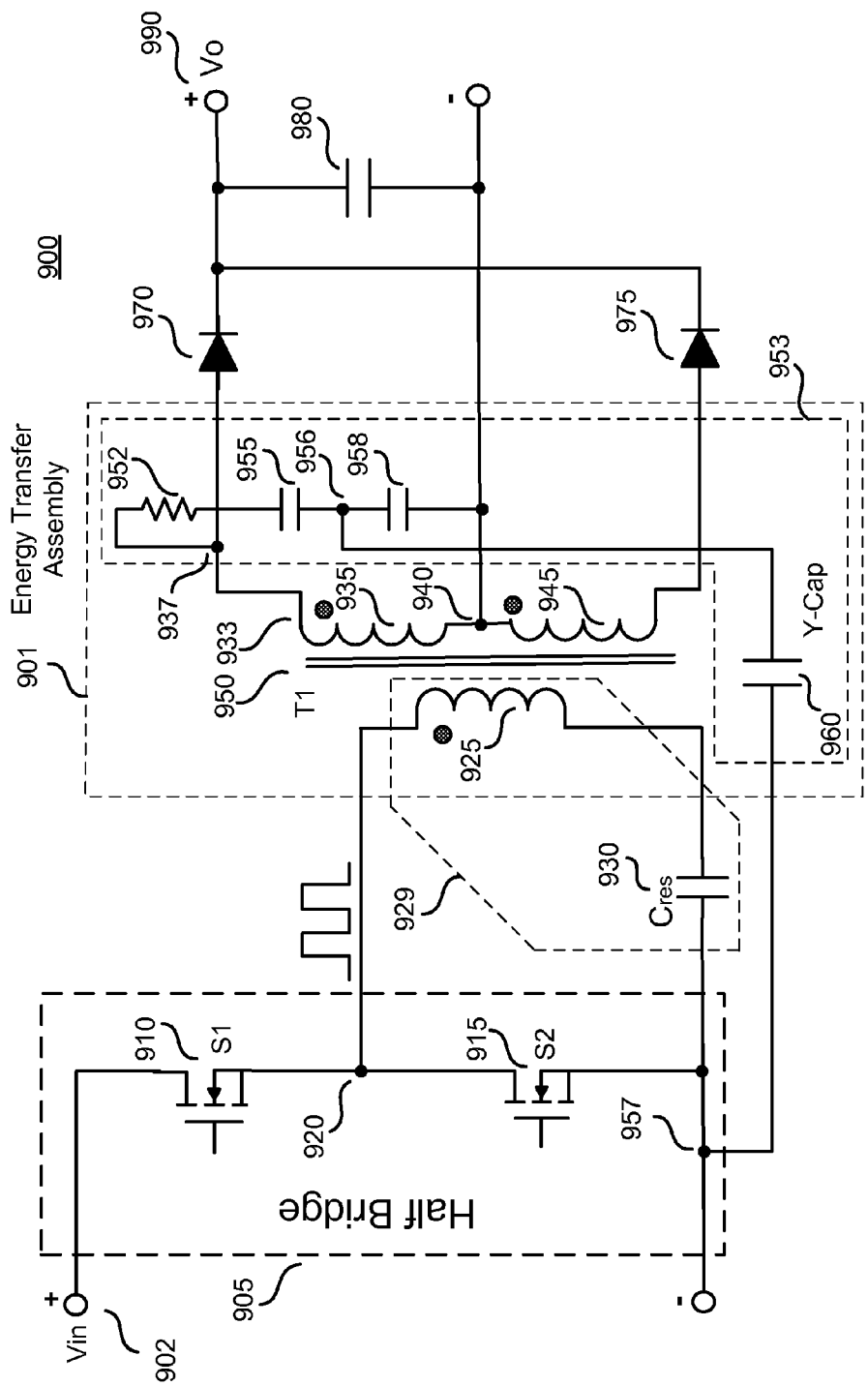
FIG. 9 is a schematic illustrating yet another example of a power converter including an energy transfer assembly and common mode noise cancellation in accordance with the teachings of the present invention.

In order to address this potential disadvantage, FIG. 9 is a schematic illustrating yet another example of a power converter 900 including an energy transfer assembly and common mode noise cancellation in accordance with the teachings of the present invention. It is appreciated that power converter 900 shares many similarities with power converter 700 and 800 of FIGS. 7 and 8. For instance, power converter 900 is an LLC resonant converter including an energy transfer element 901 coupled between an input 902 and an output 990 of the power converter 900. In one example, a switching circuit 905, which is shown as a half bridge circuit, is coupled between input 902 and energy transfer assembly 901. As shown in the depicted example, switching circuit 905 includes an upper switch S1 910 coupled to a lower switch S2 915, with a center node 920 between upper switch S1 910 and lower switch S2 915. In one example, switching circuit 905 receives input voltage Vin at input 902 and applies HF square-wave voltage pulses from center node 920 to a resonant circuit 929 coupled to switching circuit 905.

In the example depicted in FIG. 9, energy transfer assembly 901 includes transformer 950, which includes a primary winding 925 and a secondary winding 933 having a center-tap 940 between secondary winding portions 935 and 945. In one example, any one of the transformers 100, 200, 300, 400, 500 or 600 of FIGS. 1-6 having tuned leakage inductance with partially overlapped windings may be used in place of transformer 950 in accordance with the teachings of the present invention. As shown in the illustrated example, resonant circuit 929 includes a capacitor Cres 930 and two inductances that are provided by transformer 950, which include the internal magnetic inductance of transformer 950 and the leakage inductance of primary winding 925. In particular, the first inductance is the high value magnetic inductance formed with primary winding 925 and the core forms a parallel resonance with Cres 930 and transfers the load current to the secondary side. The second inductance of small value that defines the HF series resonance is the primary leakage inductance of transformer 950 through the air with the fine tuning, by the partial overlapping of the primary and secondary windings 925 and 933 of transformer 950, as described above in FIGS. 1-6. In the illustrated example, power converter 900 also includes diode 970 coupled to an output terminal 937 of secondary winding portion 935 and a diode 975 coupled to secondary winding portion 945 as shown. A capacitor 980 is also coupled between the output 990 of power converter 900 and the secondary return terminal coupled to center-tap 940 of secondary winding 933.

As shown in FIG. 9, power converter 900 also includes a CM noise cancellation circuit 953 coupled between secondary winding 933 of transformer 950 and an input return terminal 957 coupled to switching circuit 905 and to primary winding 925 of transformer 950 through capacitor Cres 930. In the specific example illustrated in FIG. 9, CM noise cancellation circuit 953 includes a first capacitive coupling, which includes Y-cap capacitor 960 and non-Y-cap capacitor 958 coupled between input return terminal 957 and a secondary return terminal coupled to center-tap 940 of the secondary winding 933. CM noise cancellation circuit 953 also includes a second capacitive coupling path, which includes Y-cap capacitor 960 and non-Y-cap capacitor 955 coupled between the input return terminal 957 and an output terminal 937 of secondary winding portion 935.

In the illustrated example, CM noise cancellation circuit 953 further includes an attenuation element 952 coupled to the network of small non-Y-cap capacitors 955 and 958. In the depicted example, attenuation element 952 includes an impedance, provided for instance by a resistor as shown, which is coupled to the network of non-Y-cap capacitors 955 and 958 to dampen and to adjust the shape of the EMI response at different frequencies of the EMI spectrum by adding a pole and adjusting the location of the pole on the EMI spectrum. In the specific example shown in FIG. 9, attenuation element 952 is coupled between the output terminal 937 of secondary winding portion 935 and the network of small non-Y-cap capacitors 955 and 958 as shown. In one example, the output terminal 937 is the in-phase output terminal of secondary winding portion 935 that is in phase with the primary input terminal of primary winding 925 coupled to receive the square wave from center node 920 of the switching circuit 905. In another example (not shown), it is appreciated that attenuation element 952 may be coupled between center-tap terminal 940 and the network of small non-Y-cap capacitors 955 and 958. It is appreciated that capacitors 955 and 958 of FIG. 9 are stacked between the output 937 and center-tap terminal 940, and that Y-cap capacitor 960 is coupled to node 956 coupled between non-Y-cap capacitors 955 and 958 as shown. In the illustrated example, the impedances introduced across the secondary or from secondary to primary are very high and have no effect on operation while at very high frequency of noise they become conducting path for noise transmission.

It is appreciated that in the example shown in FIG. 9, CM noise cancellation circuit 953 is similar to CM noise cancellation circuit 853 of FIG. 8 in that CM noise cancellation circuit 953 utilizes two inexpensive non-Y-cap capacitors 955 and 958 coupled across the secondary winding portion 935 and a bypass Y-cap capacitor 960 coupled to the input return terminal 957 instead of using two higher cost Y-cap capacitors from secondary terminals to the input return, as included in power converter 700 of FIG. 7. However, as summarized briefly above, one difference between CM noise cancellation circuit 953 of FIG. 9 and CM noise cancellation circuit 853 of FIG. 8 is that CM noise cancellation circuit 953 of FIG. 9 further includes attenuation element 952 coupled to the network of small non-Y-cap capacitors 955 and 958 as a solution for dampening the HF ringing at secondary. In particular, attenuation element 952, such as for example the impedance provided by the resistor as illustrated in specific example depicted in FIG. 9, is added in series with the smaller non-Y-cap capacitor 955 across the secondary winding portion 935 as shown, which presents a dissipative (dampening) effect at the frequency of the ringing. In one example, in accordance with the teachings of the present invention, at frequencies close to the switching frequency, the attenuation element 952 and non-Y-cap capacitor 955 as well as the non-Y-cap capacitor 958 and Y-cap capacitor 960 present a much higher impedance and have no effect on normal operation of power converter 900.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An energy transfer assembly for use in a resonant power converter, comprising:
   a first winding wound around a bobbin mounted on a magnetic core, the first winding having a first number of layers proximate to a first end along a length of the bobbin, the first winding having a second number of layers proximate to a second end along the length of the bobbin;
   a second winding wound around the bobbin, the second winding having a third number of layers proximate to the first end along the length of the bobbin, the second winding having a fourth number of layers proximate to the second end along the length of the bobbin, wherein at least a portion of one of the first and second windings overlaps at least a portion of an other one of the first and second windings around the bobbin, wherein a degree of overlap between the first and second windings is non-uniform between the first and second ends along the length of the bobbin such that a ratio of the first number to the third number does not equal a ratio of the second number to the fourth number; and
   a common mode noise cancellation circuit including:
      a first capacitive coupling between an input return terminal coupled to the first winding and a secondary return terminal coupled to the second winding; and
      a second capacitive coupling between the input return terminal coupled to the first winding and an output terminal coupled to the second winding, wherein the secondary return terminal and the output terminal are different terminals.

2. The energy transfer assembly of claim 1 wherein one of the first and second windings includes a primary winding and wherein an other one of the first and second windings includes a secondary winding.

3. The energy transfer assembly of claim 1 wherein at least one of the first and second windings includes a plurality of wires.

4. The energy transfer assembly of claim 1 wherein at least one of the first and second windings includes a center-tap.

5. The energy transfer assembly of claim 1 further comprising a common mode noise cancellation circuit coupled between the first and second windings.

6. The energy transfer assembly of claim 1 wherein the output terminal coupled to the second winding is an in-phase output terminal that is in phase with an input terminal coupled to the first winding.

7. The energy transfer assembly of claim 1 wherein the secondary return terminal coupled to the second winding is a center-tap terminal coupled to the second winding.

8. The energy transfer assembly of claim 1 wherein the first capacitive coupling comprises a first Y-cap capacitor and a first non-Y-cap capacitor, wherein the first Y-cap capacitor and the first non-Y-cap capacitor provide a first total capacitance between the input return terminal and the secondary return terminal coupled to the second winding, and
   wherein the second capacitive coupling comprises the first Y-cap capacitor and a second non-Y-cap capacitor, wherein the first Y-cap capacitor and the second non-Y-cap capacitor provide a second total capacitance between the input return terminal and the output terminal coupled to the second winding, wherein the first total capacitance is greater than the second total capacitance.

9. The energy transfer assembly of claim 8 wherein the first Y-cap capacitor is coupled to a node coupled between the first and second non-Y-cap capacitors.

10. The energy transfer assembly of claim 9 further comprising an attenuation element coupled to the first and second non-Y-cap capacitors.

11. The energy transfer assembly of claim 10 wherein the attenuation element comprises an impedance coupled to the first and second non-Y-cap capacitors.

12. The energy transfer assembly of claim 1 wherein an internal magnetic inductance of the energy transfer assembly is utilized as a first inductance of the resonant power converter, wherein a leakage inductance of the first winding is utilized as a second inductance of the resonant power converter, and wherein a capacitor coupled to the first winding is utilized as a capacitor of the resonant power converter.

13. A power converter, comprising:
   a switching circuit coupled to an input of the power converter;
   an energy transfer assembly coupled to the switching circuit, the energy transfer assembly including:
      a first winding coupled to the switching circuit and wound around a bobbin mounted on a magnetic core, the first winding having a first number of layers proximate to a first end along a length of the bobbin, the first winding having a second number of layers proximate to a second end along the length of the bobbin;
      a second winding coupled to an output of the power converter and wound around the bobbin, the second winding having a third number of layers proximate to the first end along the length of the bobbin, the second winding having a fourth number of layers proximate to the second end along the length of the bobbin, wherein at least a portion of one of the first and second windings overlaps at least a portion of an other one of the first and second windings around the bobbin, wherein a degree of overlap between the first and second windings is non-uniform between the first and second ends along the length of the bobbin such that a ratio of the first number to the third number does not equal a ratio of the second number to the fourth number; and
   a common mode noise cancelation circuit including:
      a first capacitive coupling between an input return terminal coupled to the first winding and a secondary return terminal coupled to the second winding; and
      a second capacitive coupling between the input return terminal coupled to the first winding and an output terminal coupled to the second winding, wherein the secondary return terminal and the output terminal are different terminals; and
   a resonant circuit coupled to the switching circuit, the resonant circuit including first and second inductances coupled to the switching circuit, wherein the first inductance is an internal magnetic inductance of the energy transfer assembly and where the second inductance is a leakage inductance of the first winding.

14. The power converter of claim 13 wherein the resonant circuit further includes a capacitor coupled between the switching circuit and the energy transfer assembly.

15. The power converter of claim 13 wherein the switching circuit comprises a half bridge circuit coupled between the input of the power converter and the energy transfer assembly.

16. The power converter of claim 13 wherein the energy transfer assembly further includes a common mode noise cancellation circuit coupled between the first and second windings.

17. The power converter of claim 13 wherein the output terminal coupled to the second winding is an in-phase output terminal that is in-phase with an input terminal coupled to the first winding.

18. The power converter of claim 13 wherein the secondary return terminal coupled to the second winding is a center-tap terminal coupled to the second winding.

19. The power converter of claim 13 wherein the first capacitive coupling comprises a first Y-cap capacitor and a first non-Y-cap capacitor, wherein the first Y-cap capacitor and the first non-Y-cap capacitor provide a first total capacitance between the input return terminal and the secondary return terminal coupled to the second winding, and
   wherein the second capacitive coupling comprises the first Y-cap capacitor and a second non-Y-cap capacitor, wherein the first Y-cap capacitor and the second non-Y-cap capacitor provide a second total capacitance between the input return terminal and the output terminal coupled to the second winding, wherein the first total capacitance is greater than the second total capacitance.

20. The power converter of claim 19 wherein the first Y-cap capacitor is coupled to a node coupled between the first and second non-Y-cap capacitors.

21. The power converter of claim 20 further comprising an attenuation element coupled to the first and second non-Y-cap capacitors.

22. The power converter of claim 21 wherein the attenuation element comprises an impedance coupled to the first and second non-Y-cap capacitors.

23. An energy transfer assembly for use in a resonant power converter, comprising:
   a first winding having a first number of layers wound around a bobbin mounted on a magnetic core;
   a second winding having a second number of layers wound around the bobbin, wherein the first and second numbers of layers of the first and second windings wound around the bobbin vary along the length of the bobbin, wherein at least a portion of one of the first and second windings overlaps at least a portion of an other one of the first and second windings around the bobbin; and
   a common mode noise cancellation circuit coupled between the first and second windings, wherein the common mode noise cancellation circuit includes:
      a first capacitive coupling between an input return terminal coupled to the first winding and a secondary return terminal coupled to the second winding; and a second capacitive coupling between the input return terminal coupled to the first winding and an output terminal coupled to the second winding, wherein the second return terminal and the output terminal are different terminals.

24. The energy transfer assembly of claim 23 wherein one of the first and second windings includes a primary winding and wherein an other one of the first and second windings includes a secondary winding.

25. The energy transfer assembly of claim 23 wherein at least one of the first and second windings includes a plurality of wires.

26. The energy transfer assembly of claim 23 wherein at least one of the first and second windings includes a center-tap.

27. The energy transfer assembly of claim 23 wherein the output terminal coupled to the second winding is an in-phase output terminal that is in phase with an input terminal coupled to the first winding.

28. The energy transfer assembly of claim 23 wherein the secondary return terminal coupled to the second winding is a center-tap terminal coupled to the second winding.

29. The energy transfer assembly of claim 23 wherein the first capacitive coupling comprises a first Y-cap capacitor and a first non-Y-cap capacitor, wherein the first Y-cap capacitor and the first non-Y-cap capacitor provide a first total capacitance between the input return terminal and the secondary return terminal coupled to the second winding, and
wherein the second capacitive coupling comprises the first Y-cap capacitor and a second non-Y-cap capacitor, wherein the first Y-cap capacitor and the second non-Y-cap capacitor provide a second total capacitance between the input return terminal and the output terminal coupled to the second winding, wherein the first total capacitance is greater than the second total capacitance.

30. The energy transfer assembly of claim 29 wherein the first Y-cap capacitor is coupled to a node coupled between the first and second non-Y-cap capacitors.

31. The energy transfer assembly of claim 30 further comprising an attenuation element coupled to the first and second non-Y-cap capacitors.

32. The energy transfer assembly of claim 31 wherein the attenuation element comprises an impedance coupled to the first and second non-Y-cap capacitors.

33. The energy transfer assembly of claim 23 wherein an internal magnetic inductance of the energy transfer assembly is utilized as a first inductance of the resonant power converter, wherein a leakage inductance of the first winding is utilized as a second inductance of the resonant power converter, and wherein a capacitor coupled to the first winding is utilized as a capacitor of the resonant power converter.

* * * * *